United States Patent [19]
Yamada

[11] Patent Number: 4,642,698
[45] Date of Patent: Feb. 10, 1987

[54] METHOD AND SYSTEM FOR CONDENSING BINARY IMAGE DATA

[75] Inventor: Mitsuhiko Yamada, Kyoto, Japan

[73] Assignee: Dainippon Screen Mfg. Co. Ltd., Kyoto, Japan

[21] Appl. No.: 570,261

[22] Filed: Jan. 12, 1984

[30] Foreign Application Priority Data

Mar. 28, 1983 [JP] Japan ................... 58-53401

[51] Int. Cl.⁴ ............. H04N 1/40; H04N 1/417; H04N 1/419
[52] U.S. Cl. .................. 358/260; 358/261
[58] Field of Search ............... 358/260, 261

[56] References Cited

U.S. PATENT DOCUMENTS 3,950,609  4/1976  Tanaka et al. ........... 358/260
4,048,656  9/1977  Ishii et al. ............. 358/261
4,071,855  1/1978  Wilmer ................. 358/261
4,266,249  5/1981  Chai et al. ............. 358/260

FOREIGN PATENT DOCUMENTS 3202913  8/1982  Fed. Rep. of Germany .
1441195  6/1976  United Kingdom .
1488538  10/1977  United Kingdom .
1572121  7/1980  United Kingdom .

OTHER PUBLICATIONS

Cook et al.–"Data Compression"–IBM Tech. Disclosure Bulletin–vol. 16 #3, Aug. 1973, pp. 928, 929.

Primary Examiner—Joseph A. Orsino, Jr.
Attorney, Agent, or Firm—Lowe, Price, LeBlanc, Becker & Shur

[57] ABSTRACT

This invention discloses a method of condensing line-drawing image data (binary image data: drawing or literal data expressed by two logic levels, in which logic "1" represents a "solid" pixel, and logic "0" represents a "vacant" pixel) in which data corresponding to one line-drawing pixel block composed of m×n pixels are expressed in a run-length form and/or a bit pattern form in a "word" with data for judging the condition of the line-drawing block and other necessary data.

16 Claims, 19 Drawing Figures

METHOD AND SYSTEM FOR CONDENSING BINARY IMAGE DATA

FIELD OF THE INVENTION

This Invention relates to a method and system for condensing binary data of such as a literal or a line-drawing image, particularly to such a method and system in which binary data of such as a literal or a line-drawing image are condensed by an input scanning or a computation means of an image reproducing system such as a facsimile or a scanner.

BACKGROUND OF THE INVENTION

Conventionally, as a method of processing binary image data (line-drawing or literal data expressed by two logic levels, in which logic "1" represents a "solid" pixel, and logic "0" represents a "vacant" pixel) of such as a literal or a line-drawing image (called a "line-drawing image" hereinafter) used in a color scanner, U.S. Application Ser. Nos. 471,869 now U.S. Pat. No. 4,553,172 or 507,719 discloses the following method.

That is, as shown in FIG. 1, binary data corresponding to a line-drawing pixel block B composed of multiple line-drawing pixels Lp (covering an area being one severalth of that of a pictorial pixel), i.e., one of several portions of the pictorial pixel are obtained in an input stage. In the case of FIG. 1, one line-drawing pixel block B, which is composed of 25 line-drawing pixels, or pixels for brevity, namely 5×5 pixels arranged in a matrix in the main and the sub-scanning directions, corresponds to one pictorial pixel. Then thus obtained line-drawing (binary) data are expressed in a bit signal used for expressing pictorial color separation images Y (Yellow), M (Magenta), C (Cyan) and K (Black). So when data of each color separation image are expressed in a 8 bit signal, the line-drawing image data are to be expressed in 8×4=32 bit signal. In the abovementioned method, the line-drawing pixel block B (in FIG. 1, it consists of 25 pixels) can be in one of the following three conditions. That is, the pixel block B can be in (a) a condition in which all pixels are transparent or white, namely containing no line-drawing images (called "vacant" hereinafter), (b) a condition in which all pixels are opaque or black, namely containing line-drawing images (called "solid" hereinafter) or (c) a condition in which some of the pixels contain line-drawing images (called "hybrid" hereinafter). In this approach, data representative of one line-drawing pixel block must be expressed for example in 32 bits, which consequently brings about a disadvantageous increase in the final quantity of stored data.

On the other hand, ruling image data are obtained by a computation as in the following way. That is, at first a scale of a ruling image pixel is computed, which must correspond to one-severalth of a pictorial pixel in the main and the sub-scanning directions. And then according to a desired arrangement, ruling image data are made and put into a run-length form to be stored in a line-drawing data file. As several scanning lines for the line-drawing image correspond to one scanning line for the pictorial image, the line-drawing data must be output in sychronization with the pictorial data. More precisely, as shown in FIG. 2, line-drawing data of the "vacant" part ⓐ and the "solid" part ⓑ of Line 1 are stored in a run-length form into the line-drawing data file. The same operation is performed for Lines 2 to 5 respectively. And the line-drawing data of Lines 1 to 5 are output in parallel simultaneously to be used for driving a recording beam, wherein of course the data are reconverted into their original forms.

In this case, although the ruling image data are condensed by being put into a run-length form, this method still contains a defect in that several of the same processing and output units are necessary as the ruling image data must be output in the abovementioned parallel way.

Incidentally, literal data can also be obtained by using pre-digitized letter font data, but the abovementioned defect is not resolved as the data are output also in the aforesaid parallel way.

SUMMARY OF THE INVENTION

A prime object of this invention is to resolve the abovementioned conventional problem by providing a more developed method of condensing binary image data with use of a simpler processing circuit.

The principle of this invention is as follows. That is, at first binary data are obtained from a line-drawing pixel block composed of m×n (m and n are integers) line-drawing pixels arranged in a matrix corresponding to a pictorial pixel. Then various line-drawing block data are identified as one of three types, i.e., "vacant", "solid" or "hybrid", and are processed as follows respectively. When "vacant" line-drawing blocks are in a sequence, the number of the "vacant" blocks are counted as a sequence number and are condensed to be expressed in a "word" (for example 32 bit signal). When "solid" line-drawing blocks are in a sequence, the same procedure as above is performed. When a "hybrid" line-drawing block exists singly, bit pattern data of the block are expressed in a "word". When "hybrid" line-drawing blocks are in a sequence, bit pattern data of the blocks are condensed to be expressed in a "word" and the sequence number of the blocks is expressed in the next "word". Namely, each of these types of line-drawing pixel blocks can be condensed. In addition, said three types can be distinguished by attaching a special code to each "word", and a color factor can also be managed by the same procedure.

The above and other objects and features of this invention can be appreciated more fully from the following detailed description when read with reference to the accompanying drawings.

PREFERRED EMBODIMENT OF THE INVENTION

Figure 1:
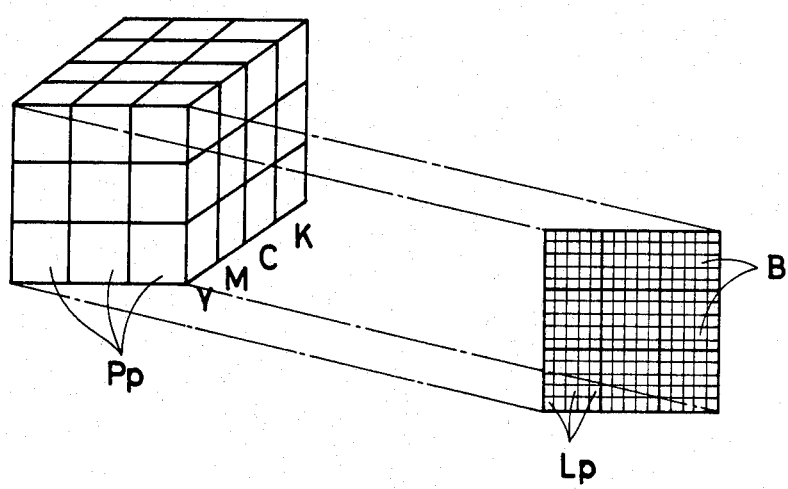
FIG. 1 shows a relation of between a line-drawing pixel and a pictorial pixel.
Figure 2:
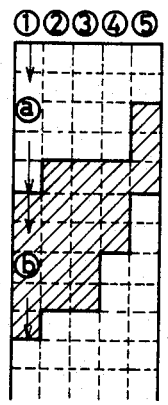
FIG. 2 shows a line-drawing image for explaining the conception of condensing binary image data of a conventional system.
Figure 3:
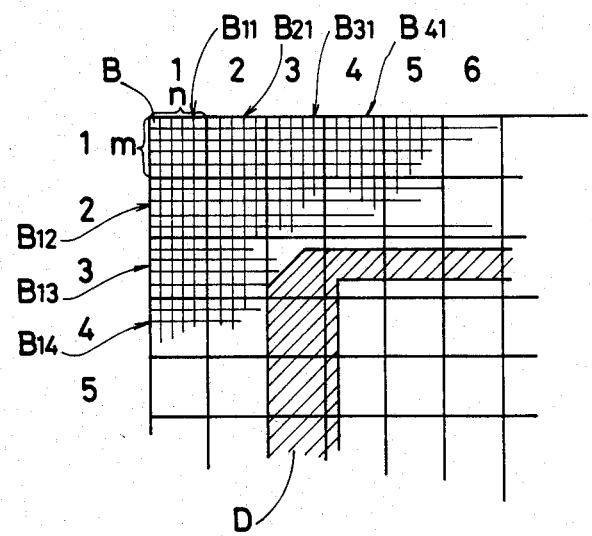
FIG. 3 shows a line-drawing image on an original picture for explaining the conception of this invention.
Figure 4:
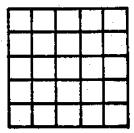
FIGS. 4(a), (b), (c) shows three possible types of line-drawing image pattern of a line-drawing pixel block.
Figure 4:
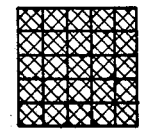
Figure 4:
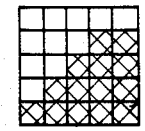

As shown in FIG. 3, by scanning a line-drawing image D, binary data representative of the line-drawing image are obtained, wherein line-drawing pixel block B composed of m×n line-drawing pixels corresponds to one pictorial pixel. In this, data of every line-drawing pixel block are classified as (a) "vacant", (b) "solid" or (c) "hybrid" as shown in FIG. 4, and are processed in a corresponding one of the following four ways. When line-drawing blocks of the (a) "vacant" type are in a sequence as from Block $B_{11}$ of the first scanning line to Block $B_{32}$ of the third scanning line, the sequence number of such blocks for example Blocks $B_{11}$ to $B_{32}$ are expressed in a "word" as a run-length form. When line-drawing pixel blocks of the (b) "solid" type are in a sequence as in Block $B_{34}$ and succeeding blocks, the sequence numbers of such blocks are expressed in the same way as the previous case. When a line-drawing pixel block of the (c) "hybrid" type exists independently as in Block $B_{33}$, $B_{43}$ or $B_{53}$, data of such a block are expressed in a bit pattern mode (a mode in which an image pattern is expressed in a "word" (bit signal)). When line-drawing pixel blocks of (c) "hybrid" type are in a sequence as in blocks $B_{44}$, $B_{45}$ . . . , data of such blocks are expressed in two "words", in which one "word" is used for expressing the line-drawing image pattern of one of the blocks and the other "word" is used for expressing the sequence number of the blocks.

Figure 5:
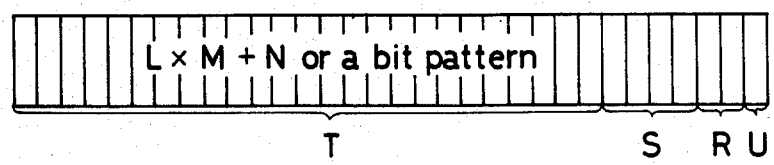
FIG. 5 shows a conceptional chart of a "word" (a bit signal).

FIG. 5 shows the composition of a "word" (in this case, it consists of 32 bits). The first bit U is used for classifying the data contained in the "word" to a pictorial data group (U=0) or to a line-drawing data group (U=1). The second group of two bits R, are used for identifying, or judging, whether the data contained in the "word" are (i) "vacant" (for example R=01), (ii) "solid" (for example R=10), (iii) isolated hybrid, or "hybrid in isolation" (for example R=11) or (iv) sequential hybrid, or "hybrid in a sequence" (for example R=00). The third group of four bits S is used for expressing color factor when line-drawing images are colored.

Figure 6A:
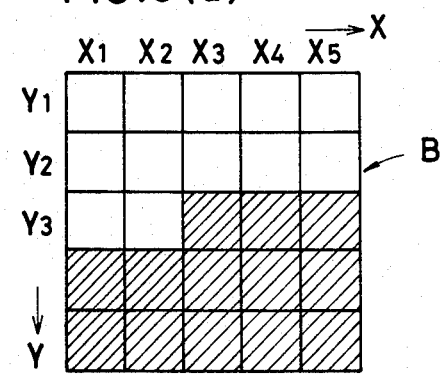
FIGS. 6(a), (b) show a relation between a line-drawing image pattern and bit pattern data on a "word".
Figure 6B:
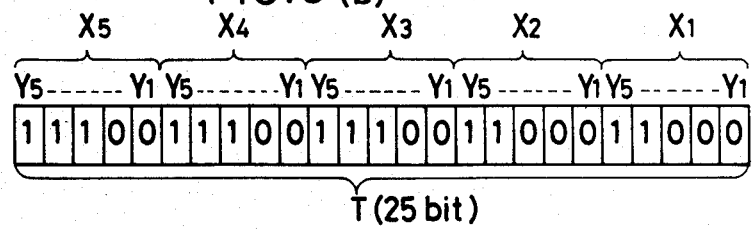

The last 25 bits T are used for expressing data of line-drawing pixel blocks in respective cases. When the line-drawing pixel blocks B are in one of conditions (i) or (ii) above, the sequence number of the blocks (including a case in which only one block exists independently) is allotted to the last 25 bits T. The sequence number can be expressed as M (the number of the blocks in the main scanning direction)×L (the number of the blocks in the sub-scanning direction which is a variable)+N (the number of the blocks situated in the last main scanning line of the sequence). In this, the procedure of putting bit pattern data into a run-length data can be renewed every several main scanning lines. When the line-drawing pixel block is in a condition (iii) as shown in FIG. 6(a), each bit of the 25 bits T is used for expressing the corresponding line-drawing pixel data by taking a logic level of "1" or "0" as shown in FIG. 6(b). When the line-drawing pixel blocks are in condition (iv), a first "word" is used for expressing line-drawing image pattern of a block, and another "word" is used for expressing the sequence number of such blocks in a run-length form.

The following explanation is based on a case wherein the method of this invention is applied to an image reproducing system such as a color scanner.

Figure 7:
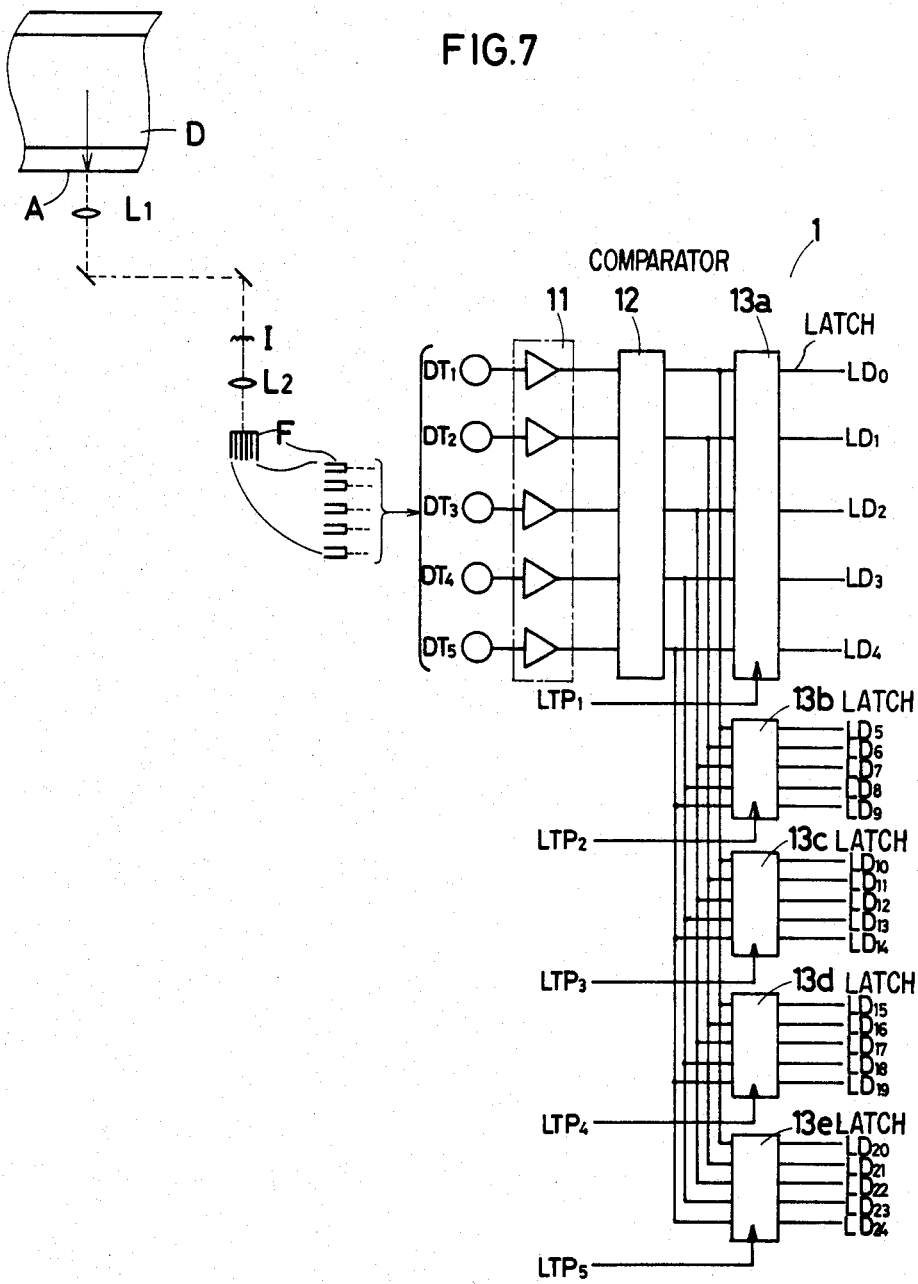
FIG. 7 shows an input device for embodying this invention.

FIG. 7 shows an input scanner device for line-drawing pixels. A laser beam transmitted through (or reflected at) an original picture A placed on an original picture drum D is brought to pickup lenses $L_1$ and $L_2$. The beam from the lens $L_2$ is introduced to one edge of an optical fiber F in a certain projection size. The optical fiber F distributes fractionated line-drawing image data to photo-diodes $DT_1$, $DT_2$, $DT_3$, $DT_4$ and $DT_5$, which diodes convert optical data into electronic analog data. Then the analog data are amplified in an amplified 11 and converted into binary data in a comparator 12 and are input to latches $13a$, $13b$, $13c$, $13d$ and $13e$.

Figure 8:
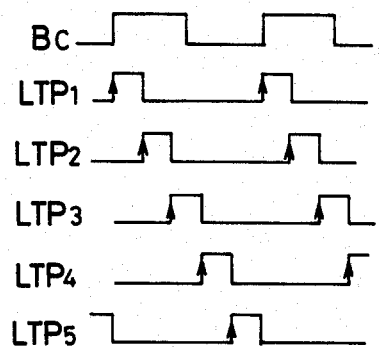
FIGS. 8(a), (b) show a timing chart and a data form of the input device shown in FIG. 7.
Figure 8:
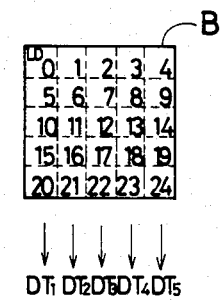

These latches $13a$ to $13e$ hold the binary data and output them according to timing pulses $LTP_1$ to $LTP_5$ as shown in FIG. 8(a) in which the pulses having a duration corresponding to one line-drawing pixel are arranged to have phase differences relative to each other as in FIG. 8. Namely, line-drawing image data $LD_0$ to $LD_{24}$ corresponding to the aforesaid one line-drawing pixel block are output on command of the pulses $LTP_1$ to $LTP_5$ in every five line-drawing pixel data which are the constituents of a line-drawing pixel block in the sub-scanning direction. Finally, line-drawing pixel data as shown in FIG. 8(b) are output to a decoder (mentioned later).

In FIG. 8(a), a block clock $B_c$ is a clock pulse which corresponds to a one line-drawing pixel block, which block pulse $B_c$ is also used for sampling a pictorial pixel in a color sanner.

Figure 9:
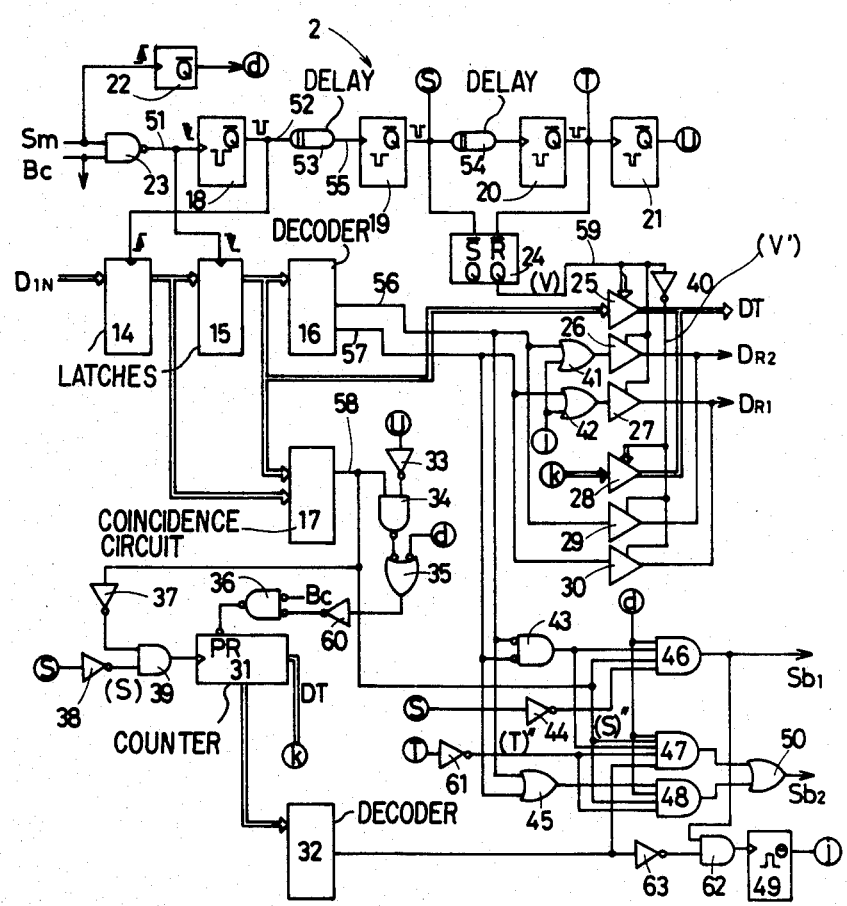
FIG. 9 shows a data condensation circuit.

Thus obtained line-drawing image data are condensed in a condensation circuit 2. In FIG. 9, broad lines indicate 25 bit data lines, which means elements on the way of the broad lines represents one of 25 similar elements. 25 bit data of a line-drawing pixel block output from the latches $13a$ to $13e$ (shown in FIG. 7) are simultaneously input to latches 14 (comprising 25 latch units) on command of the block clock $B_c$.

Figure 10:
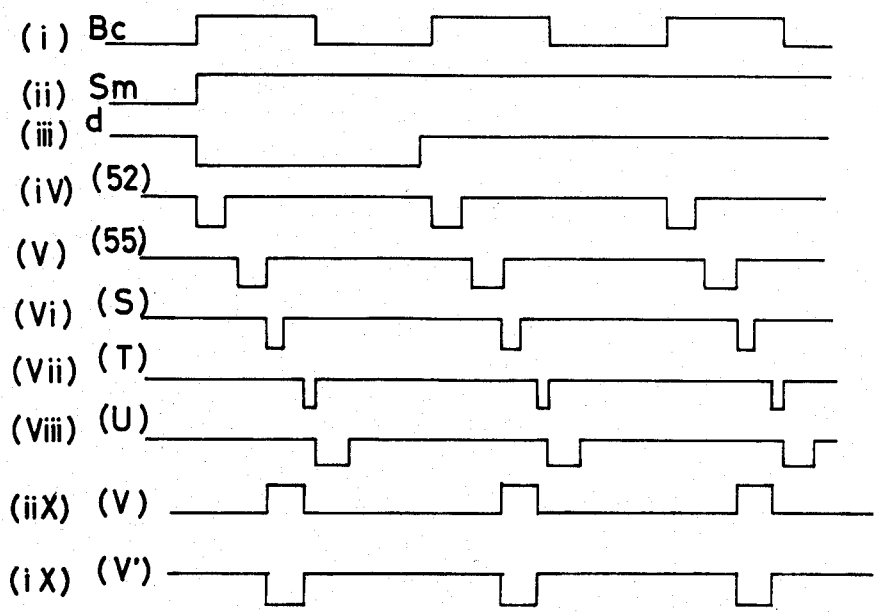
FIG. 10 shows a timing chart of the condensation circuit shown in FIG. 9.

In a timing shown in FIG. 10, when a control signal $S_m$ becomes "1", the block clock $B_c$ gets a sign to pass through a NAND-gate 23 in order to carry out a condensation procedure. Then according to the time of the downward transition of block clock $B_c$, data of a line-drawing pixel block held on the latches 14 are brought to latches 15, and then to a decoder 16.

The block clock $B_c$ is also input to a one shot multivibrator 18 (called an "OSMV" hereinafter). The OSMV 18 outputs one pulse (52) in the fall time of the block clock $B_c$. This pulse (52) is input via a delay unit 53 to another OSMV 19. When said one pulse (52) is output from the OSMV 18, data of the next line-drawing pixel block are input to the latches 14. A control signal (S) is output from the OSMV 19, and is input via a delay unit 54 to an OSMV 20. The OSMV 20 outputs a control signal (T), which is input to an OSMV 21. The OSMV 21 outputs a control signal (U). The three control signals are shown in FIGS. 10(vi), (vii), (viii). Said control pulses (S) and (T) are input to the set terminal and the reset terminal of a flip-flop circuit 24 respectively. The flip-flop circuit 24 outputs a pulse (v) which rises in synchronism with the control pulse (S) and falls in synchronism with the control pulse (T). The pulse (V) is inverted in an inverter 40 to be a pulse (V)' which rises in synchronism with the control pulse (T) as shown in FIGS. 10(ix), (x). These pulses (S), (T), (U), (V), and (V)' are used for controlling the whole condensation circuit 2 as mentioned later.

Meanwhile, the data of the line-drawing pixel block 10 held on the latches 15 are input to the decoder 16 as well as to a coincidence circuit 17. The decoder 16 determines whether data of each line-drawing pixel block are of "vacant", "solid" or "hybrid" types and expresses them in a combination of logic signals of "0" and "1" (56)(57).

Assuming that the data of a line-drawing pixel block held on the latches 15 are (X) and the data of a line-drawing pixel block held on the latches 14 are (Y), the data are processed in the following way.

In a case where (X) are "vacant in isolation" and (Y) are other than "vacant", the logic signals (56) and (57) become "0" and "1" respectively. These logic signals (56) and (57) are to be output as judge data "0, 1" from tri-state buffers 29 and 30 synchronizing with the pulse (V)'. While, a logic signal (58) from the coincidence circuit 17 becomes "1" meaning "disagreement". Said logic signal (58) is inverted in an inverter 37 to be "0" and is used for closing an AND-gate 39. Therefore, an inverted pulse (S)' (a pulse which is obtained by inverting the control pulse (S) in an inverter 38) isn't input to a counter 31 (as mentioned later, the count number of the counter 31 represents the number of blocks in the run-length).

Meanwhile, an inverted pulse (U)' (a pulse which is obtained by inverting the control pulse (U) of the previous line-drawing block is input via an inverter 33, a NAND-gate 34, a NOR-gate 35, an inverter 60 and NAND-gate 36 to the counter 31 to set its preset number at "1". Then data $D_T$ having the value "1" (the sequence number of the line-drawing block of "vacant") is output from tri-state buffers 28 in synchronism with the inverted pulse (V)' (with the status, or classification data "0,1"). At the same time, the decoder 16 outputs the logic signals (56) and (57) via an OR-gate 45 to open an AND-gate 48. And the AND-gate 48 outputs an inverted pulse (T)" being inverted in an inverter 61 as a strobing signal $Sb_2$ synchronized with the pulse (V)'. This strobing signal is used for controlling timings of data reciprocation between the condensation circuit etc. and a disc memory etc. provided behind.

In a case where (X) are "vacant in a sequence" and (Y) are other than "vacant", the logic signals (56) and (57) become "0" and "1" respectively. Consequently as in the previous case, these signals (56) and (57) are to be output as the status data "0,1" from the tri-state buffers 29 and 30 respectively synchronizing with the pulse (V)', while the logic signal (58) from the coincidence circuit 17 becomes "0" meaning "agreement". Therefore, the output signal from the inverter 37 becomes "1", which makes the inverted pulse (S)' pass through the AND-gate 39, and the counter 31 counts the number of the input inverted pulses (S)'. Data of the count number of the counter 31 (in other words, the sequence number of the vacant blocks) are output as data $D_T$ from the tri-state buffers 28 in synchronism with the inverted pulse (V)' (with the status data "0,1"). The logic signal (58) from the coincidence circuit 17 is changed from "0" to "1" when "vacant" block data are held on the latches 15 and block data other than "vacant" are held on the latches 14. Then the count number of the counter 31 is preset to "1" by the inverted pulse (U)'. At the same time, the signals (56) and (57) output from the decoder 16 via the OR-gate 45 open the AND-gate 48 which makes the inverted pulse (T)" pass through the gate to be output as the strobing signal $Sb_2$ synchronism with the pulse (V)'.

In a case where (X) is sequential hybrid" and (Y) is other than "hybrid", both of the signals (56) and (57) output from the decoder 16 become "0". These signals (56) and (57) are to be output as status data "1, 1" from respective tri-state buffers 26 and 27 in synchronism with the pulse (V) as follows. That is, at first a decoder 32 judges whether the count number of the counter 31 is "1" or not. In this case, as the count number is "1", the decoder 32 outputs a signal of logic "0". The signal of logic "0" is inverted in an inverter 63 to be a signal of logic "1" and is input via an AND-gate 62 to an OSMV 49. The OSMV 49 outputs a pulse (j) (in this case, its logic is "1"), which is output via AND-gates 41 and 42 from the tri-state buffers 26 and 27 in synchronism with the pulse (V). This output signal containes the status data "1, 1", while the logic signal (58) from the coincidence circuit 17 becomes "1" meaning "disagreement". And the logic signal (58) is inverted in an inverter 37 consequently closing the AND-gate 39. So the signal (S)' isn't input to the counter 31. Meanwhile, bit pattern data are output from the latches 15 via tri-state buffers 25 as the data $D_T$ synchronism with the pulse (V) (with the judge data "1,1"), while the logic signals (56) and (57) open a NAND-gate 43, of which output signal of logic "1" is input to an AND-gate 46. As the signal of logic "1" from the coincidence circuit 17 is input to the other terminal of the AND-gate 46 beforehand, the AND-gate 46 is opened to pass the inverted pulse (S)" being inverted in an inverter 44 through the gate as a strobing signal $Sb_1$.

In a case where (X) is sequential hybrid and (Y) is other than "hybrid", both of the logic signals (56) and (57) output from the decoder 16 become "0" being the same as the previous case. In this, the output logic signal of the decoder 32 becomes "1" to make the OSMV 49 produce a signal of logic "0", which is input to the OR-gates 41 and 42. Then both OR-gates 41 and 42 output the signal of logic "0" to respective tri-state buffers 26 and 27, which output status data "0, 0" in synchronism with the pulse (V), while bit pattern data are output from the latches 15 via the tri-state buffers 25 as the data $D_T$ synchronism with the pulse (V). In this case the strobing signal $Sb_1$ is output from the AND-gate 46 in synchronism with the pulse (V). On the other hand, the logic signal (58) of the coincidence circuit 17 becomes "0" and the counter 31 counts the inverted pulses (S)' until the line-drawing blocks of a sequence ends. Then the count number of the counter 31 is output from the tri-state buffers 28 as the data $D_T$ in synchronism with the pulse (V)'. While the judge data "0,0" is output from the tri-state buffers 29 and 30. In this case, as the output of the decoder 32 becomes "1" and the output of the NAND-gate 43 becomes "1", when the output of the coincidence circuit 17 becomes "1" meaning "disagreement", the strobing signal $Sb_2$ is output from the AND-gate 47. After that, the count number of the counter 31 is preset to "1" on command of the inverted pulse (U)'. That is, only when the "hybrid" blocks are in a sequence, a "word" is used for expressing data of the line-drawing block, and the next "word" is used for expressing the sequence number of the blocks.

In a case where (X) is "solid" and (Y) is other than "solid", the logic signals (56) and (57) output from the decoder 16 become "1" and "0" respectively, while the output logic signal of the coincidence circuit 17 becomes "1" meaning "disagreement". Therefore, the counter 31 doesn't count the inverted pulses (S)'. And the count number of the counter 31 is preset to "1" on command of the inverted pulse (U)'. So the logic signal of "1" is output from the tri-state buffers 28 as the data $D_T$ in synchronism with the pulse (V)'. At the same time, status data "1,0" are output from the tri-state buffers 29 and 30, and an inverted signal (T)" is output via the AND-gate 48 from an OR-gate 50.

In a case where (X) is "solid" in a sequence and (Y) is other than "solid", the logic signals (56) and (57) from the decoder 16 become "1" and "0" respectively. In this case, data of the sequence number of line-drawing pixel blocks are output from the tri-state buffers 28, and the status data "0,1" are output from the tri-state buffers 29 and 30 in synchronism with the pulse (V)'. At the same time, the output signals (56) and (57) from the decoder 16 open AND-gate 48 which outputs the strobing signal $Sb_2$ in synchronism with the pulse (V)'.

Incidentally, the above explanation doesn't mention to color codes (see FIG. 5). For simplification, such codes can be processed as the data $D_T$ or the judge data $D_{R2}$ and $D_{R1}$.

In addition, the above explanation takes a way of condensing data of line-drawing pixel blocks of "hybrid in a sequence", but if such blocks are limited, they can also be expressed in a conventional way.

Thus condensed line-drawing data by the operation of the condensation circuit 2 are stored into a disc memory 4. And after undergoing color designation by an input from an external device like a control panel at need, the line-drawing data are output from the memory 4 to a recording head by the operation of a decoder 5 as shown in FIG. 11.

Figure 11:
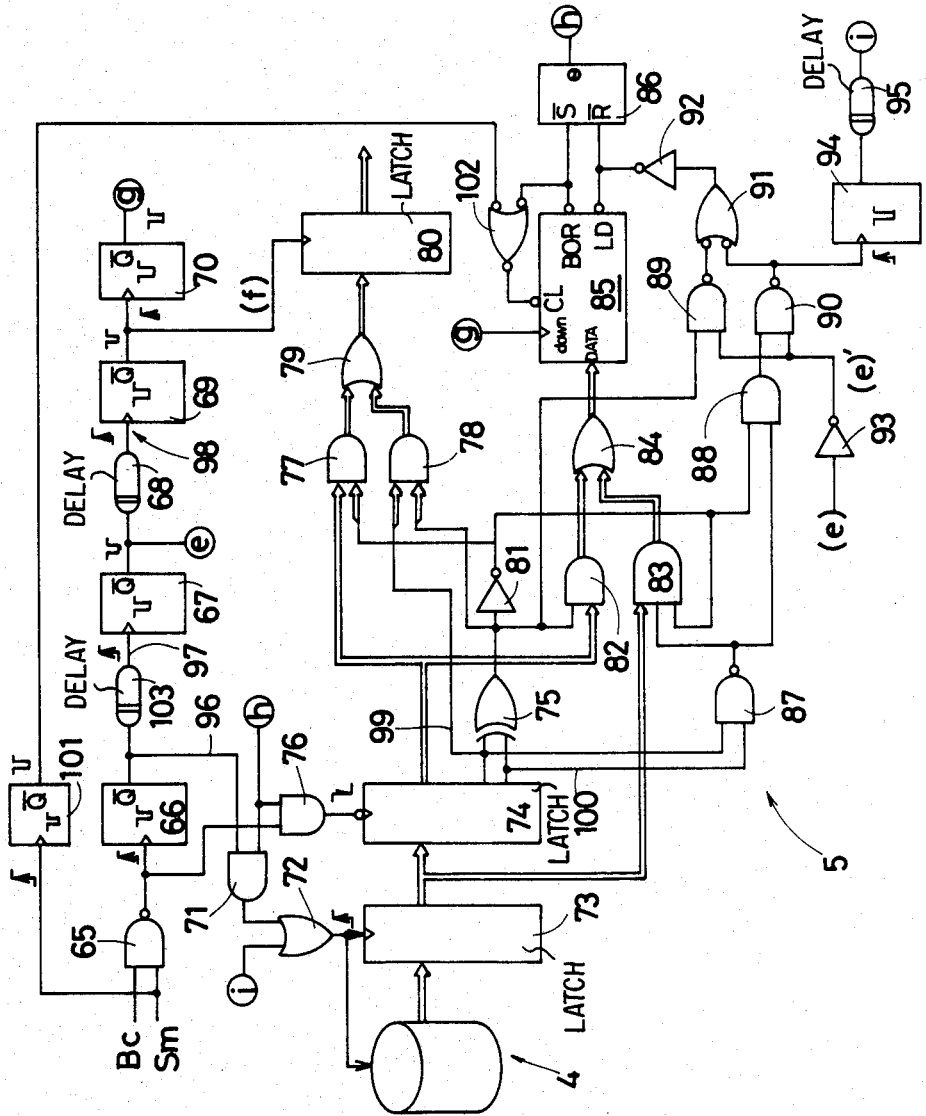
FIG. 11 shows a decoder.

A disc memory 4 shown in FIG. 11 comprises a buffer memory, an address counter etc., which reciprocates data of one line-drawing pixel block (one "word") with other devices on command of said strobing signals $Sb_1$, $Sb_2$ or of the block clock Bc. Broad lines show 32 bit data lines, in which the 32 bit data are composed of 25 bit data $D_T$, 2 bit status data $DR_1$ and $DR_2$ for distinguishing among line-drawing block types, 4 bit color data and 1 bit status data for distinguishing between pictorial and line-drawing pixels. Therefore, of course every element on the path of the broad lines represents one of 32 similar elements, the following mainly mentions about the 25 bit data $D_T$ and 2 bit status data $DR_1$ and $DR_2$ for distinguishing line-drawing block types.

Figure 12:
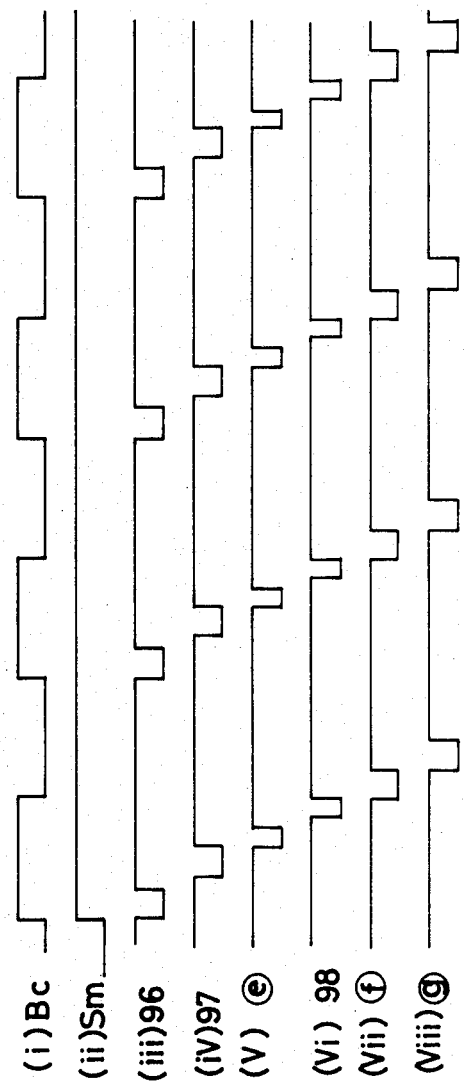
FIG. 12 shows a timing chart of the decoder shown in FIG. 11.

When a data control logic signal Sm becomes "1" to begin decoding as shown in FIG. 12, the block clock Bc passes through a NAND-gate 65, while data of a line-drawing pixel block held on latches 73 are brought to latches 74 in synchronism with the falling transition time of the block clock Bc. The block clock Bc is input to an OSMV 66, which outputs a pulse (96) in synchronism with the rise-time of the block clock Bc, and the pulse (96) is input via an AND-gate 71 and an OR-gate 72 to the latches 73. The latches 73 hold data of the next line-drawing pixel block on command of the pulse (96).

On the other hand, an OSMV 67 outputs a pulse (e) synchronism with the rise time of the pulse (97) being input via a delay unit 103 from the OSMV 66. The pulse (e) is input to a delay unit 68 which outputs a pulse (98). A OSMV 69 outputs a pulse (f) synchronism with the rise time of the pulse (98) being input from the delay unit 68. An OSMV 70 outputs a pulse (g) synchronized with the pulse (f) being input from the OSMV 69. These pulses (e), (f) and (g) control the timing of the decoder 5 as mentioned later.

In a case where data of a line-drawing pixel block of "vacant" or "solid" type are held on the latches 74, the status data "0,1" or "1,0" are output from the latches 74 to an Exclusive OR-gate 75, and the E-OR-gate 75 outputs a signal of logic "1" to open AND-gates 78. When data of a vacant type line-drawing pixel are on the latches 74, a signal (99) of logic "0" is input to the AND-gates 78. Therefore the AND-gates 78 output 25 bit data where every bit is logic "0" via OR-gates 79 to latches 80. When solid line-drawing block data are held on the latches 74, a signal (99) of logic "1" is input to the AND-gates 78. Therefore the AND-gates 78 output 25 bit data where every bit is of logic "1" via the OR-gates 79 to the latches 80.

In this, the data of a line-drawing pixel block are input to the latches 80 synchronism with the fall time of said pulse (f). And the data of a line-drawing pixel block can be output synchronism with any strobing signal. For example the rise time of the pulse (f) can provide a preferable output timing of the data to subsequent devices.

Meanwhile a signal of logic "1" output from the E-OR-gate 75 opens AND-gates 82 to input data of the sequence number of the line-drawing blocks held on the latches 74 in a run-length form via the AND-gate 82 and an AND-gate 84 to a counter 85. While the signal of logic "1" from the E-OR-gate 75 also opens AND-gate 89 which makes an inverted pulse (e)' obtained by inverting the pulse (e) in an inverter 93 pass the gate through to be input via an OR-gate 91 and an inverter 92 to the load terminal of the counter 85 as a load signal. The load signal designates the counter 85 to take in the data of the sequence number of the line-drawing blocks being input from the AND-gates 82.

Meanwhile the load signal is input to the reset terminal of a flip-flop circuit 86 to reset its output to be logic "0", while a count-down pulse (g) is input to the counter 85. Therefore, if the pre-set number of the ounter 85 is "1", it is made to be "0" when only one pulse (g) is input to the counter 85. When the pre-set number of the counter 85 becomes "0", the counter 85 outputs a borrow signal to the set terminal of the flip-flop circuit 86 which outputs a signal (h) of logic "1". When the signal (h) is input to the latches 74 and 73, the latches 74 take in the data of a line-drawing pixel block held on the latches 73, and data of the next line-drawing pixel block are input to the latches 73.

In a case where data of a line-drawing pixel blocks of "vacant" or "solid" are in a sequence, the latches 80 output 25 bit data in which each bit has a logic of "0" or "1" in synchronism with said pulse (f) until the preset number (the sequence number) of the counter 85 becomes "0". During the above condition, the latches 74 don't take in data of the next line-drawing pixel block because the signal (h) output from the flip-flop circuit 86 is "0".

In a case where data of a line-drawing pixel block are isolates "hybrid", in other words when the status data have value "1, 1", the E-OR-gate 75 outputs a signal of logic "0" which opens AND-gates 77. Then the 25 bit line-drawing pattern data held on the latches 74 are input via the OR-gates 79 to the latches 80 in the same way as the previous case. At the same time, the status data "1,1" ((99), (100)) are output from the latches 74 to a NAND-gate 87. Unlike the next case, AND-gates 83 and 88 are not opened, but only the bit pattern data are output from the latches 80.

In a case where data of line-drawing blocks are sequential "hybrid", in other words when the status data have value "0,0", the E-OR-gate 75 outputs a signal of logic "0" which opens the AND-gates 77. Then the 25 bit pattern data held on the latches 74 are input via the OR-gate 79 to the latches 80 like in the previous case. At the same time, the NAND-gate 87 opens AND-gates 83 and 88. Then sequence number data of the line-drawing pixel blocks held on the latches 73 are input via the AND-gates 83 and 84 to the counter 85, while the inverted pulse (e)' is also input to the counter 85 via an AND-gate 90 and the AND-gate 91 and the inverter 92 as the load signal. On command of the load signal, the sequence number of the line-drawing blocks is set up on the counter 85 and begins to be counted down by the pulse (g). In the course of time, the bit pattern data held on the latches 80 are output in synchronism with the pulse (f) certain times corresponding to the sequence number. The inverted pulse (e)' is also input to the flip-flop circuit 86, which outputs a signal (h) of logic "0" for preventing the data of the next line-drawing pixel block from being input to the latches 73 and 74. As mentioned before, the flip-flop circuit 86 outputs the signal of logic "1" on command of the borrow signal from the counter 85 to take in the data of the next line-drawing pixel block to the latches 73 and 74.

An OSMV 94 outputs a pulse signal in synchronism with the inverted pulse (e)' via the AND-gate 90. The pulse signal is output from a delay unit 95 as a signal (i) to the AND-gate 72, which gives a command to input the data of the next line-drawing pixel block from the disc memory 4 to the latches 73.

Figure 13:
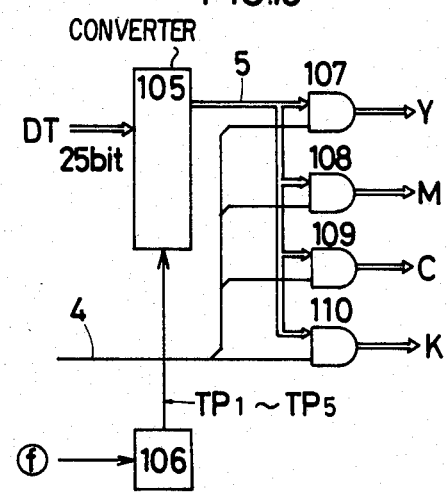
FIG. 13 shows an embodiment of a converter provided behind the decoder shown in FIG. 11.
Figure 14:
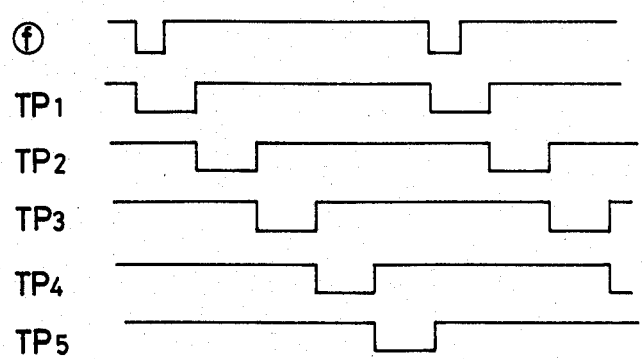
FIG. 14 shows a timing chart of the converter shown in FIG. 13.

Thus obtained data of the line-drawing pixel blocks in the "vacant", "solid" or "hybrid" conditions are converted into for example 5×5 matrix data before being input to the recording head. FIG. 13 shows an example of a converter for performing the abovementioned conversion process. At first, on command of timing pulses $TP_1$ to $TP_5$ as shown in FIG. 14 obtained by using the pulse (f), a converter 105 composed of 25 AND-gates converts 25 bits serial data of a line-drawing pixel block into 5×5 matrix data (which correspond to one pictorial pixel). Then the 5×5 matrix data of the line-drawing pixel block are distributed to corresponding data group of separation colors Y, M, C and K according to the color codes included in the data and are output from corresponding AND-gates 107, 108, 109 and 110.

Figure 15:
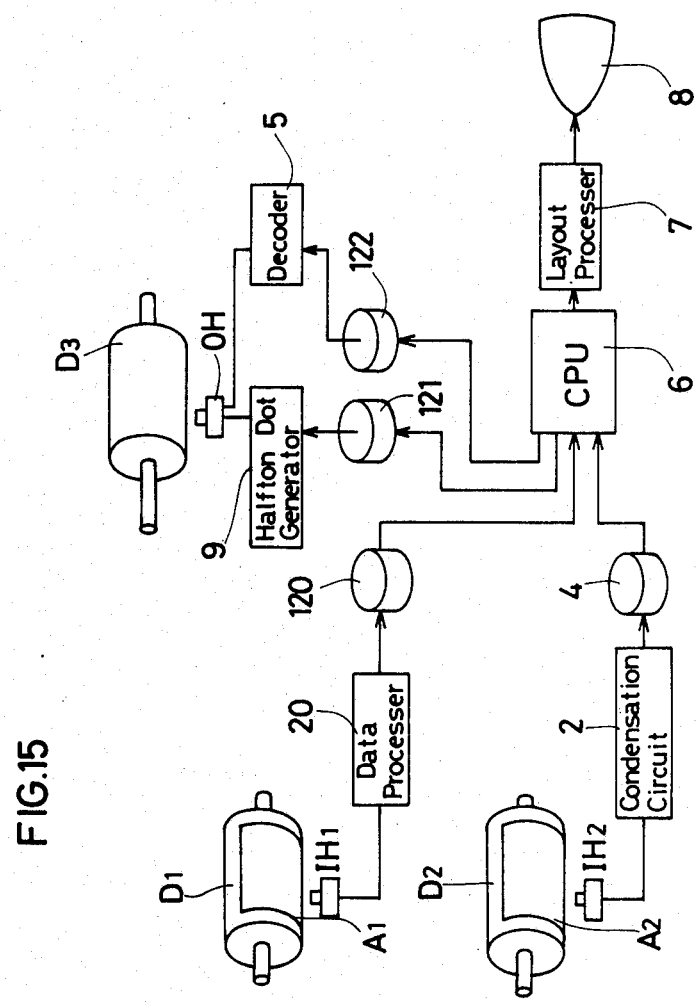
FIG. 15 shows a layout color scanner system to which the method of this invention is applied.

FIG. 15 shows a layout scanner system to which the method of this invention is applied. An original picture of pictorial components on a drum $D_1$ and an original picture of line-drawing components on a drum $D_2$ are scanned individually. That is, image data obtained by scanning the original picture of pictorial components $A_1$ with use of an input head $IH_1$ as color component signals B, G and R are converted into color separation image signals Y, M, C and K and undergo color correction, gradation correction, under color removal, sharpness emphasis etc. at need in a scanner data processer 20. The processed data from the data processer 20 are stored into a disc memory 120. On the other hand, image data obtained by scanning the original picture of line-drawing components $A_2$ with use of an input head $IH_2$ having an input unit as shown in FIG. 7 are condensed in the condensation circuit 2 to be binary image data and stored into the disc memory 4. Thus obtained data are input to a layout processer 7 under control of a CPU 6 to be displayed as a corresponding image on a monitor 8. Based on the displayed image on the screen of the monitor 8, an operator performs a layout work.

As this kind of layout procedure, a method as disclosed in U.S. application Ser. No. 517,982 can be adopted, therefore no explanation for the method is given here because it is not a main factor of this invention.

Pictorial image data and line-drawing image data which experienced a layout process are once stored in disc memories 121 and 122 respectively. Then the pictorial image data are compared to the dot patterns of a halftone dot generator 9 as disclosed in U.S. Pat. No. 3,725,574 or in U.S. application Ser. No. 365,890 now U.S. Pat. No. 4,486,788 in order to be halftone image data for driving a recording head OH, while the line-drawing image data are decoded in the decoder 5 to be output to the recording head OH. This kind of recording method for the pictorial and the line-drawing data is disclosed in U.S. application Ser. Nos. 471,869 or 507,719, therefore no explanation for the method is given here.

As mentioned above, data of a line-drawing pixel block are expressed in a run-length form or in a bit pattern form appropriately case by case, which enables an image reproducing system to attain higher condensation ratio consequently being permitted to have a memory of lower capacity. Therefore an application of the method of this invention to an image reproducing system can reduce the cost of the system.

I claim:
1. A method for condensing binary image data and reproducing images comprising the steps of:
 (a) obtaining data of a line-drawing pixel block composed of m×n pixels by an input scanning means or by a computation means,
 (b) identifying a status of the data as:
  (i) vacant;
  (ii) solid; or
  (iii) hybrid;
 (c) providing status data differentiating between pixel blocks which are vacant or solid and between blocks which are of a hybrid type,
 (d) providing run-length data identifying a number of vacant or solid line-drawing pixel blocks which are in a sequence;
 (e) providing m×n bit pattern data describing a line-drawing hybrid pixel block,
 (f) generating a word including said status data and said run-length data for vacant or solid pixel blocks and including said status data and said bit pattern data for hybrid pixel blocks,
 when said line-drawing pixel blocks are "hybrid" and in a sequence, using the generated word for expressing the status data and the m×n bit pattern data and using a next word for expressing the run-length data corresponding to the sequence number of the hybrid line-drawing pixel blocks.
2. A method claimed in claim 1 comprising the further step of processing line-drawing image data with pictorial image data when the line-drawing pixel block corresponds to one pictorial pixel.
3. A method claimed in claim 1 in which color data are included in the generated "word".

4. A method claimed in claim 3 in which said generated word includes a classification data for differentiating between a line-drawing pixel block and a pictorial pixel block comprising a plurality of pictorial pixels each comprising a plurality of line-drawing pixels.

5. A system for condensing binary image data and reproducing images comprising:
   (a) means for obtaining data of a line-drawing pixel block composed of m×n pixels by an input scanning means or by a computation means,
   (b) means for identifying a status of the data as:
      (i) vacant;
      (ii) solid; or
      (iii) hybrid;
   (c) means for providing status data differentiating between pixel blocks which are vacant or solid and between blocks which are of a hybrid type,
   (d) means for providing run-length data identifying a number of vacant or solid line-drawing pixel blocks which are in a sequence;
   (e) means for providing m×n bit pattern data describing a line-drawing hybrid pixel block,
   (f) means for generating a word including said status data and said run-length data for vacant or solid pixel blocks and including said status data and said bit pattern data for hybrid pixel blocks, wherein said word generating means includes means for outputting the m×n bit pattern data of a hybrid line-drawing pixel block, and wherein said bit pattern data outputting means outputs the bit pattern data of hybrid line drawing pixel blocks in a sequence in the word, and said word generating means includes run-length data output means for outputting the sequence number of the hybrid line-drawing pixel block in a next word.

6. A system as claimed in claim 5 wherein said bit pattern data outputting means comprises a tri-state buffer means which outputs the bit pattern data of the line-drawing blocks in synchronism with the status data.

7. A system claimed in claim 5 in which the run-length data output means comprises:
   (a) a counter means which counts the sequence number of the vacant or solid line-drawing pixel blocks; and
   (b) a tri-state buffer which outputs data of the count number in synchronism with the status data.

8. A system claimed in claim (7) further comprising a counter for counting the sequence number of hybrid line-drawing pixel blocks.

9. A method of condensing binary image data in reproducing images comprising the steps of:
   (a) successively obtaining image data of line-drawing pixel blocks each of which is composed of m pixels (in the main scanning direction)×n pixels (in the sub-scanning direction) by an input scanning means or a computation means;
   (b) encoding a state of each line-drawing pixel block as one of the following four states:
      (I) a "vacant" state indicating all the pixels in a pixel block are vacant;
      (II) a "solid" state indicating all the pixels in a pixel block are of a solid density;
      (III) an isolated "hybrid" state; and
      (IV) a sequential "hybrid" state,
   the "hybrid" state indicating that the pixel block mixedly comprises vacant and solid pixels, and determining different status data expressive of the result of the encoding;
   (c) counting a sequence number (including one) representing the number of pixel blocks of an identical state and providing the sequence number as a run-length data;
   (d) outputting a first word composed of a predetermined number of bits expressive of either
      (i) a combination of the status data indicating "solid" or "vacant" state obtained in step (b) and the run-length data obtained in step (c), or
      (ii) a combination of the status data indicating "isolated hybrid" or "sequential hybrid" obtained in step (b) and bit pattern data indicating the state of every pixel in the hybrid block; and
   (e) when the pixel blocks are determined to be "sequential hybrid", outputting a second word composed of said predetermined number of bits expressive of the run-length data obtained in step (c) after the output of the first word.

10. A method as recited in claim 9 in which the scanning area of a line-drawing pixel block composed of m×n pixels is equal to one pictorial pixel.

11. A method as recited in claim 9 in which said first word comprises the same number of bits as that of a word for representing a pictorial pixel.

12. A method as recited in claim 9 in which the step of outputting the first word comprises the further step of including in said word:
   (a) distributing data, to distribute the data contained in the word either to a pictorial data group or to a line-drawing data group; and
   (b) data to indicate the color of a pixel block when it is in the "solid" state.

13. An apparatus for condensing binary image data in reproducing images comprising:
   (a) a means for successively obtaining image data of line-drawing pixel blocks each of which is composed of m pixels (in the main scanning direction)×n pixels (in the sub-scanning direction) by an input scanning means or a computation means;
   (b) indicating means for indicating a state of each line-drawing pixel block as one of the following four states:
      (I) a "vacant" state, indicating all the pixels in a block are vacant;
      (II) a "solid" state, indicating all the pixels in a block are solid;
      (III) a "hybrid" state in isolation;
      (IV) a "hybrid" state in a sequence,
   the "hybrid" state indicating that the pixel block mixedly comprises "vacant" and "solid" pixels, said indicating means operable to output a status data expressive of the result of the decoding;
   (c) a counting means for counting a sequence number (including one) representing the number of pixel blocks of an identical state and outputting the sequence number as a run-length data;
   (d) an outputting means for outputting at one time either
      (I) said status data and said run-length data or
      (II) said status data and said bit pattern data.

14. An apparatus as recited in claim 13 in which said outputting means comprises:
   (a) first outputting means for outputting either
      (i) a word expressive of a combination of the status data indicating "isolated hybrid" and bit pattern data expressive of the bit pattern of the block, or (ii) a word expressive of a combination of the status data indicating "sequential hybrid" and bit pattern data of the hybrid blocks; and
(b) a further ouputting means for outputting either
  (i) a word expressive of a combination of the status data indicating "solid" or "vacant" state obtained from the indicating means and the run-length data obtained by the counting means, or
  (ii) a second word expressive of the run-length data obtained by the counting means, when said first outputting means ouputs a first word expressive of the status data indicating "sequential hybrid".

15. An apparatus as recited in claim 13 in which the indicating means comprises:
(a) a first means for outputting a first status signal indicating the status of each line-drawing pixel block as "vacant", "solid" or "hybrid";
(b) a second means for outputting a second status signal indicating whether or not pixel blocks of an identical state are in a sequence when a pixel block is determined to be in the "hybrid" state;
(c) a converter means for converting a first status signal indicating a "hybrid" state into
  (i) a status signal expressive of a "hybrid" pixel block in isolation, or
  (ii) a status signal expressive of "hybrid" pixel blocks in a sequence in accordance with the encoding of said second encoder means.

16. An apparatus as recited in claims 13 in which the counting means comprises:
(a) a coincidence circuit means for determining whether or not the state of each pixel of a block is the same as a corresponding pixel of the next block;
(b) a preset circuit means for outputting a run-length data of 1 when all pairs of corresponding pixels are determined by the coincidence circuit not to be in the same state; and
(c) a counter circuit means for outputting a run-length data indicating the number of blocks in a sequence wherein all pairs of corresponding pixels are determined by the coincidence circuit means to be in the same state.

* * * * *